United States Patent [19]

Welschof et al.

[11] 4,405,032
[45] Sep. 20, 1983

[54] WHEEL HUB ASSEMBLY

[75] Inventors: Hans-Heinrich Welschof, Rodenbach; Rudolf Beier, Offenbach, both of Fed. Rep. of Germany

[73] Assignee: Lohr & Bromkamp GmbH, Offenbach am Main, Fed. Rep. of Germany

[21] Appl. No.: 261,500

[22] Filed: May 7, 1981

[30] Foreign Application Priority Data

May 9, 1980 [DE] Fed. Rep. of Germany ....... 3017757

[51] Int. Cl.³ .............................................. B60K 17/30
[52] U.S. Cl. ................................ 180/259; 301/6 WB; 464/89
[58] Field of Search ..................... 180/70.1, 254, 258, 180/259; 301/6 WB, 6 D, 9 CN, 9 SG; 308/191, DIG. 8; 464/89

[56] References Cited

U.S. PATENT DOCUMENTS

| 3,012,421 | 12/1961 | Cull | 464/89 |
| 3,757,883 | 9/1973 | Asberg | 180/70 |
| 3,878,695 | 4/1975 | Pitner | 464/89 |
| 3,944,011 | 3/1976 | Ernst et al. | 180/70 |

Primary Examiner—John A. Pekar
Assistant Examiner—Pierre Huggins
Attorney, Agent, or Firm—Toren, McGeady and Stanger

[57] ABSTRACT

A wheel hub assembly includes a tubular shaped hub member and a univeral joint member connected to the hub member for rotating it about an axis of rotation. The universal joint member fits into the hub member with each having spaced apart confronting surfaces. A filler material is filled into the space between the confronting surfaces and forms a torque transmitting connection between the universal joint member and the hub member.

13 Claims, 4 Drawing Figures

WHEEL HUB ASSEMBLY

SUMMARY OF THE INVENTION

The present invention is directed to a wheel hub assembly for a vehicle and the assembly includes a hub member, bearing means for supporting the hub member during rotation, and a universal joint member for driving the hub member.

In U.S. Pat. No. 3,944,011 one form of such a wheel hub assembly is disclosed. In that arrangement, a universal joint member is connected to the hub member by splines. The hub member forms the inner race of an axial-radial bearing. Such a construction, however, has the disadvantage that the splined connection requires a certain amount of space and there is the further problems that deformation of the joint member and the development of heat in the joint member may adversely affect the bearing. There is the advantage in this assembly, however, that it can be dismantled if the joint member or bearing requires replacement.

Another similar hub assembly is disclosed in U.S. Pat. No. 3,757,883. In this arrangement, the universal joint member is press-fitted into a bore in the hub member. In this assembly there is also the risk of deformation of the joint member at the maximum articulation angle and/or maximum torque which conditions affect the bearing. Furthermore, the hub member reaches a high temperature because of the heat transmitted to it from a brake disc, and such heat can be transferred to the universal joint member.

Therefore, it is the primary object of the present invention to provide an improved hub assembly.

In accordance with the present invention, a wheel hub assembly includes a tubular shaped hub member with a bearing for rotatably supporting the hub member, and a universal joint member for driving the hub member. The universal joint member fits into the hub member and the two members have spaced apart confronting surfaces. A filler material is filled into the space between the two members and forms a torque transmitting connection between them. Preferably, the confronting surface of the universal joint member has a non-circular configuration.

The bearing or the hub member is made up of an inner and an outer bearing member with a plurality of rolling elements between them, and the inner bearing member is formed by the hub member.

An advantage of this arrangement is that the relatively expensive material required to form the inner race of the bearing is not a part of the universal joint member. The universal joint member is usually a constant velocity ratio universal joint formed by an inner member and outer member with balls extending between them for transmitting torque. It is possible to make the outer member of such a universal joint member from a relatively thin tube or sheet metal. The outer joint member can be formed with a non-circular outer configuration which affords effective torgue transmission when it is inserted into the hub member with the confronting spaces between the two members filled with the filler material.

In such an assembly, machining of the various parts can be reduced to a minimum, and close tolerances are not required.

The filler material may be a synthetic resin material, a hard rubber, or soft solder. By selecting a suitable material, it is possible to insulate against the transfer of heat between the hub member and the joint member and also to provide a noise and vibration damping effect. The selection of filler material depends on the conditions experienced within the individual assembly.

If one of the parts of the assembly must be replaced, the connection between the hub member and the joint member can be severed by suitable measures, such as heating or pressing out.

The filler material may include a bonding agent incorporating particles of a solid substance. Suitable solid substances may include ferrous chips, aluminium chips, and sand constituting up to about 80 and 90 percent of the filler material. An epoxy resin would be a suitable bonding agent for use in such a filler material.

The inside shape of the hub member into which the joint member is fitted, may be non-circular corresponding to the outside configuration of the joint member. Such an arrangement affords a measure of support for the joint member when it is transmitting torque. The hub member and the joint member may be secured against relative axial displacement by providing a circumferentially extending groove in one or both so that the filler material keys into the groove.

In a preferred embodiment, the confronting surfaces of the hub member and the joint member extending in the axial direction of the assembly each have a similar shape to ensure good torque transmission.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
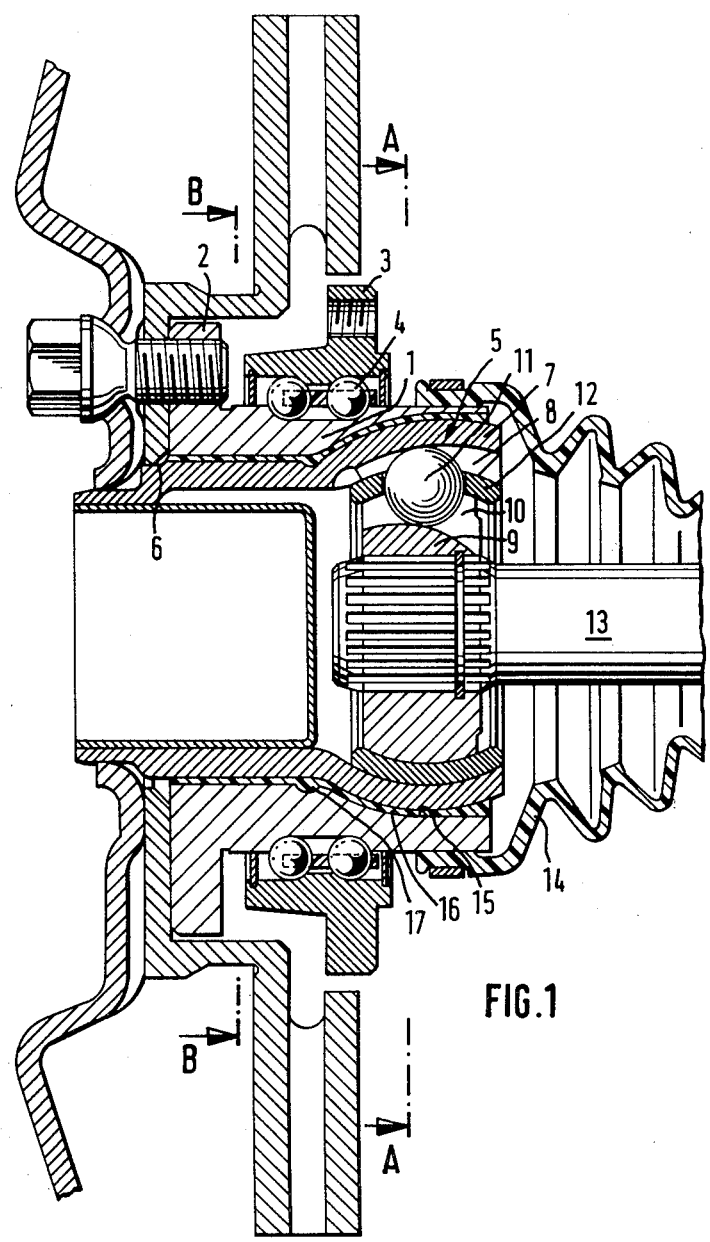
FIG. 1 is a sectional view of one embodiment of a wheel hub assembly incorporating the present invention.

In FIG. 1 a wheel hub assembly is shown including a tubular-shaped hub member 1 extending in the axial direction of the assembly with a flange 2 extending radially outwardly from one end of the hub member. At the opposite end from the flange 2, the outside surface of the hub member 1 forms the inner race of a double row axial-radial ball bearing with an outer race 3 combining with the inner race to hold the balls 4 in position. A brake disc 6 is connected to the flange 2 of the hub member 1. Further, a wheel is secured to the flange of the hub member by suitable bolts.

As illustrated in FIG. 1, the hub member 1 is hollow and has a constant velocity ratio universal joint 5 inserted into its hollow interior. The universal joint 5 is formed of an outer joint member 7 having generally axially extending grooves 8, an inner joint member 9 having complementary shaped grooves 10 with balls 11 extending between the grooves for transmitting torque from one joint member to the other. Balls 11 are held in windows or apertures in a cage 12 with the cage positioned between the outer and inner joint members 7, 9. The shape of the grooves 8, 10 in the joint members is such that the balls 11 are located in a plane bisecting the angle formed between the rotational axes of the outer and inner joint members when the universal joint 5 is bent. This bisecting feature affords the constant velocity ratio running characteristic of the joint. Inner joint member 9 has a splined bore with which the splined end of a drive shaft 13 meshes. A bellows type sealing boot 14 encloses the universal joint 5 keeping lubricant within the joint and preventing dirt from entering it.

Outer joint member 7 of the universal joint 5 fits into the cavity 15 formed in the hub member 1 with an annular space 16 formed between the confronting surfaces of these two members. In other words, the outside surface of the outer joint member 7 is spaced inwardly from the inside surface of the hub member 1. This space 16 is filled with a filler material and the filler material is cast into the space after the parts have been assembled together. The filler material connects the hub member 1 and the outer joint member 7 together for transmitting torque. A circumferentially extending groove is formed in the inside surface of the hub member 1 and in the outside surface of the outer joint member 7 and the filler material enters into these corresponding grooves and secures the two parts against relative axial displacement.

Figure 2:
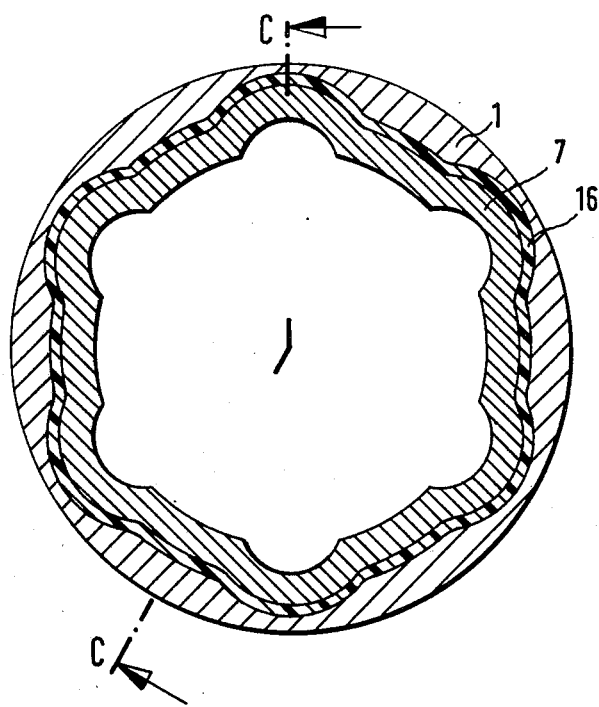
FIG. 2 is a sectional view taken along the line A—A of FIG. 1.

In FIG. 2 a section of the wheel hub assembly is shown taken along the line A—A in FIG. 1. The outer surface of the outer joint member 7 and the inner surface of the hub member 1, which also forms the inner bearing member, each has a non-circular configuration. With the provision of the filler material in the space 16 and the non-circular shape of the two parts, a satisfactory transmission of torque between them is assured.

Figure 3:
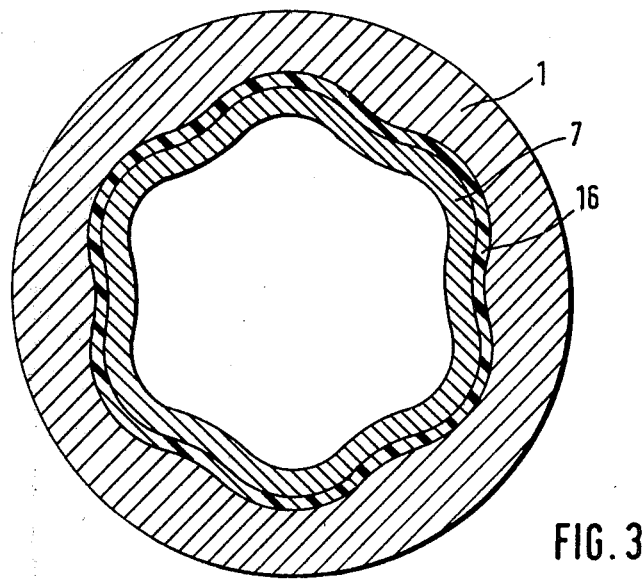
FIG. 3 is a sectional view taken along the line B—B of FIG. 1.

In FIG. 3 a section is shown taken along the line B—B of FIG. 1. In this view, it can be seen that the shape of the outer surface of the outer joint member and the inner surface of the hub member is not circular. The filler material placed between and interconnecting the outer joint member and the hub member acts as a vibration absorber and heat insulation between the two parts.

Figure 4:
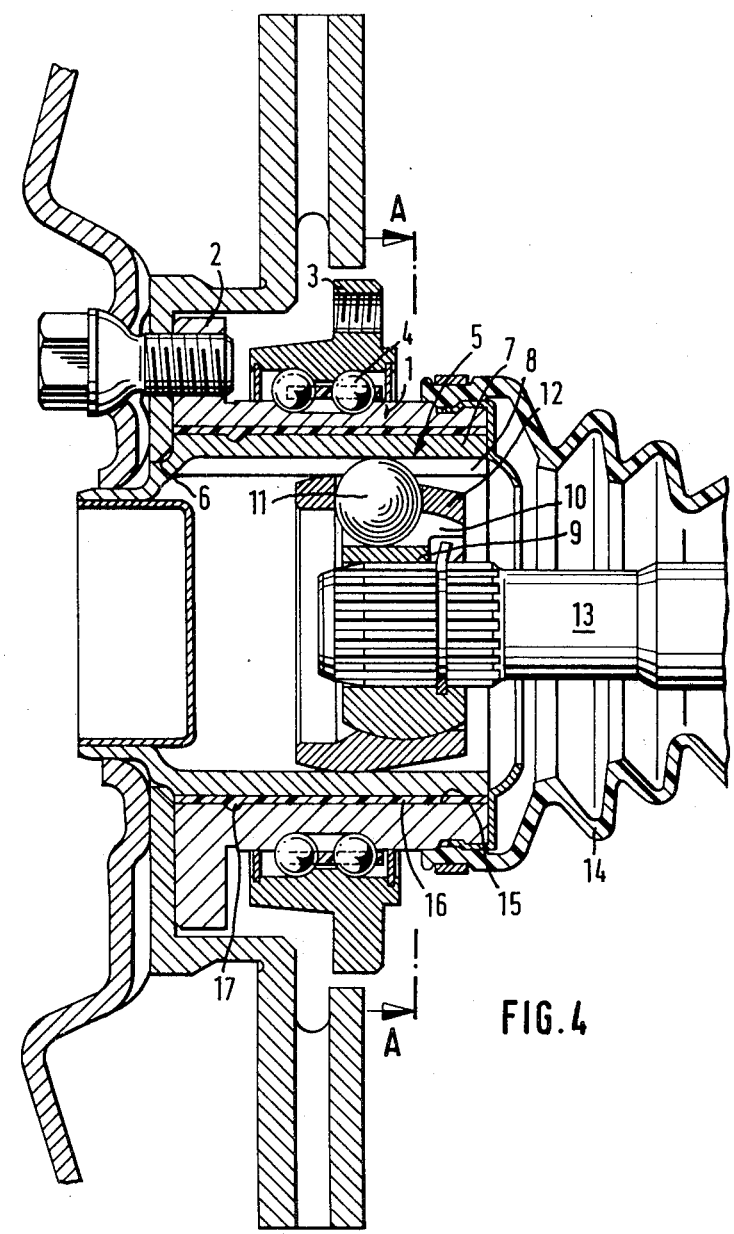
FIG. 4 is a sectional view, similar to FIG. 1, illustrating another embodiment of the wheel hub assembly incorporating the present invention.

In FIG. 4 another embodiment of the present invention is shown similar to that illustrated in FIG. 1, and similar parts have been designated by the same reference numerals. In this second embodiment, however, the interior of the hub member is cylindrically shaped and the universal joint 5 is capable of accommodating relative axial movement between the inner and outer joint members 7, 9. Universal joints of other types could be used in a wheel hub assembly in accordance with the present invention.

The filler material can be a hard rubber, soft solder or a suitable synthetic resin. Further, the filler material could be a bonding agent, such as an epoxy resin, incorporating particles of a solid substance, such as ferrous or aluminium chips or sand.

In addition to the above-mentioned advantages of vibration damping and heat insulation, the wheel hub assembly according to the present invention does not require any special accuracy in machining of the hub member and the outer joint member. Proper centering of these parts relative to one another can be achieved by appropriately positioning the components prior to the introduction of the filler material into the space 16 between them. Further, in accordance with the present invention, it is possible to form the outer joint member 7 from sheet metal or tubular stock, since the outer member is supported by the filler material when assembled within the hub member so that it can be formed with a relatively thin wall construction.

While specific embodiments of the invention have been shown and described in detail to illustrate the application of the inventive principles, it will be understood that the invention may be embodied otherwise without departing from such principles.

We claim:

1. A wheel hub assembly comprising a tubular shaped hub member having an axis of rotation, bearing means for rotatably supporting said hub member, a universal joint member engageable with said hub member for driving said hub member about the axis of rotation thereof, said universal joint member is positioned within said hub member, said hub member and said universal joint member having confronting surfaces extending in the direction of the axis of rotation of said hub member, said confronting surfaces are spaced radially apart and after said universal joint member is assembled within said hub member a filler material is filled into the space between the confronting surfaces so that it completely fills the space and forms a torque transmitting connection between said universal joint and said hub member.

2. A wheel hub assembly, as set forth in claim 1, wherein the confronting surface of said universal joint member transverse to the axis of rotation of said hub member has a non-circular configuration.

3. A wheel hub assembly, as set forth in claims 1 or 2, wherein said bearing means comprises an outer bearing member and an inner bearing member with said inner bearing member being formed by said hub member, and a plurality of rolling elements positioned between said inner and outer bearing members.

4. A wheel hub assembly, as set forth in claims 1 or 2, wherein said filler material is a material selected from the group consisting of a synthetic resin material, or a soft solder material.

5. A wheel hub assembly, as set forth in claim 1 or 2, wherein the confronting surface of said hub member is non-circular in section transverse to the rotational axis of said hub member.

6. A wheel hub assembly, as set forth in claim 2, wherein the confronting surfaces of said hub member and universal joint member having substantially similar configurations.

7. A wheel hub assembly, as set forth in claim 6, wherein said universal joint member being formed of a sheet metal material.

8. A wheel hub assembly, as set forth in claim 1, wherein said universal joint member comprises an outer joint member insertable into said hub member and an inner joint member positioned within said outer joint member, the inner surface of said outer joint member and the outer surface of said inner joint member having complementary grooves therein and balls positioned in said grooves in said inner and outer joint members for transmitting torque therebetween.

9. A wheel hub assembly comprising a tubular shaped hub member having an axis of rotation, bearing means for rotatably supporting said hub member, a universal joint member engageable with said hub member for driving said hub member about the axis of rotation thereof, said universal joint member is positioned within said hub member, said hub member and said universal joint member having confronting surfaces extending in the direction of the axis of rotation of said hub member, said confronting surfaces are spaced apart and a filler material is filled into the space between the confronting surfaces and forms a torque transmitting connection between said universal joint and said hub member, said filler material comprises a bonding agent incorporating particles of a solid substance.

10. A wheel hub assembly comprising a tubular shaped hub member having an axis of rotation, bearing means for rotatably supporting said hub member, a universal joint member engageable with said hub member for driving said hub member about the axis of rotation thereof, said universal joint member is positioned within said hub member, said hub member and said universal joint member having confronting surfaces extending in the direction of the axis of rotation of said hub member, said confronting surfaces are spaced apart and a filler material is filled into the space between the confronting surfaces and forms a torque transmitting connection between said universal joint and said hub member, the confronting surface of said universal joint member transverse to the axis of rotation of said hub member has a non-circular configuration, said filler material comprises a bonding agent incorporating particles of a solid substance.

11. A wheel hub assembly, as set forth in claims 9 or 10, wherein said solid substance is a material selected from the group consisting of ferrous chips, aluminium chips or sand.

12. A wheel hub assembly comprising a tubular shaped hub member having an axis of rotation, bearing means for rotatably supporting said hub member, a universal joint member engageable with said hub member for driving said hub member about the axis of rotation thereof, said universal joint member is positioned within said hub member, said hub member and said universal joint member having confronting surfaces extending in the direction of the axis of rotation of said hub member, said confronting surfaces are spaced apart and a filler material is filled into the space between the confronting surfaces and forms a torque transmitting connection between said universal joint and said hub member, the confronting surface of said hub member is non-circular in section transverse to the rotational axis of said hub member, at least one of said confronting surfaces of said hub member and said universal joint member has a groove extending circumferentially relative to the axis of rotation of said hub member and said filler material is keyed into said groove to prevent relative axial displacement between said hub member and said universal joint member.

13. A wheel hub assembly comprising a tubular shaped hub member having an axis of rotation, bearing means for rotatably supporting said hub member, a universal joint member engageable with said hub member for driving said hub member about the axis of rotation thereof, said universal joint member is positioned within said hub member, said hub member and said universal joint member having confronting surfaces extending in the direction of the axis of rotation of said hub member, said confronting surfaces are spaced apart and a filler material is filled into the space between the confronting surfaces and forms a torque transmitting connection between said universal joint and said hub member, said confronting surface of said universal joint member transverse to the axis of rotation of said hub member has a non-circular configuration, the confronting surface of said hub member is non-circular in section transverse to the rotational axis of said hub member, at least one of said confronting surfaces of said hub member and said universal joint member has a groove extending circumferentially relative to the axis of rotation of said hub member and said filler material is keyed into said groove to prevent relative axial displacement between said hub member and said universal joint member.

* * * * *